United States Patent
Yang et al.

(10) Patent No.: US 9,036,695 B2
(45) Date of Patent: May 19, 2015

(54) MOTION-COMPENSATED TEMPORAL FILTERING BASED ON VARIABLE FILTER PARAMETERS

(75) Inventors: Junlan Yang, Chicago, IL (US); Yeping Su, Camas, WA (US); Christopher A. Segall, Camas, WA (US)

(73) Assignee: SHARP LABORATORIES OF AMERICA, INC., Camas, WA (US)

(*) Notice: Subject to any disclaimer, the term of this patent is extended or adjusted under 35 U.S.C. 154(b) by 605 days.

(21) Appl. No.: 12/938,285

(22) Filed: Nov. 2, 2010

(65) Prior Publication Data

US 2012/0106639 A1    May 3, 2012

(51) Int. Cl.
| | |
|---|---|
| *H04N 7/12* | (2006.01) |
| *H04N 11/02* | (2006.01) |
| *H04N 11/04* | (2006.01) |
| *G06T 5/00* | (2006.01) |
| *H04N 19/139* | (2014.01) |
| *H04N 19/172* | (2014.01) |
| *H04N 19/117* | (2014.01) |
| *H04N 19/615* | (2014.01) |

(52) U.S. Cl.
CPC ....... *G06T 5/002* (2013.01); *G06T 2207/10016* (2013.01); *H04N 19/139* (2014.11); *H04N 19/172* (2014.11); *H04N 19/117* (2014.11); *H04N 19/615* (2014.11)

(58) Field of Classification Search
CPC ...... H04N 7/50; H04N 7/26244; H04N 5/145
USPC .......................... 375/240.01, 240.12, 240.16
See application file for complete search history.

(56) References Cited

U.S. PATENT DOCUMENTS

| | | |
|---|---|---|
| 5,309,237 A | 5/1994 | Singh |
| 5,512,856 A | 4/1996 | Doak |
| 5,512,956 A | 4/1996 | Yan |

(Continued)

FOREIGN PATENT DOCUMENTS

| | | |
|---|---|---|
| EP | 0 666 695 A2 | 8/1995 |
| JP | 07-231450 | 8/1995 |

(Continued)

OTHER PUBLICATIONS

International Search Report for U.S. Appl. No. PCT/JP2011/063192 mailed Sep. 20, 2011.

(Continued)

*Primary Examiner* — Chikaodili E Anyikire
(74) *Attorney, Agent, or Firm* — Brooks Acordia IP Law, PC; Pejman Yedidsion; David Ripma (57) ABSTRACT

Systems and devices for, and methods of, motion-compensated temporal filtering based on variable filter parameters. A method embodiment includes (a) determining, by a processor having memory, a pixel-related residue image based on a set of differences between a current pixel intensity of a current frame and a corresponding pixel intensity of a previous frame, wherein the corresponding pixel intensity is augmented by a motion-compensated vector of the previous frame; (b) determining an intensity weight based on the determined pixel-related residue image and a temporal filtering parameter; and (c) filtering the pixel intensity of the current frame based on the determined intensity weight and the motion compensated vector of the previous frame.

26 Claims, 6 Drawing Sheets

(56) References Cited

U.S. PATENT DOCUMENTS

| | | | |
|---|---|---|---|
| 6,442,203 B1 * | 8/2002 | Demos | 375/240.16 |
| 6,760,487 B1 * | 7/2004 | Linares | 382/275 |
| 7,034,892 B2 | 4/2006 | Ojo et al. | |
| 7,110,455 B2 | 9/2006 | Wu et al. | |
| 7,366,242 B2 | 4/2008 | Demos | |
| 7,548,278 B2 | 6/2009 | Shin et al. | |
| 2002/0101543 A1 | 8/2002 | Ojo et al. | |
| 2003/0039310 A1 | 2/2003 | Wu et al. | |
| 2004/0101058 A1 * | 5/2004 | Sasai et al. | 375/240.26 |
| 2004/0196901 A1 * | 10/2004 | Demos | 375/240 |
| 2005/0047509 A1 * | 3/2005 | Lee et al. | 375/240.19 |
| 2006/0045181 A1 | 3/2006 | Chen | |
| 2006/0140273 A1 | 6/2006 | Wu | |
| 2006/0222078 A1 * | 10/2006 | Raveendran | 375/240.16 |
| 2006/0285020 A1 | 12/2006 | Shin et al. | |
| 2006/0291557 A1 | 12/2006 | Tourapis | |
| 2007/0014365 A1 | 1/2007 | MacInnis et al. | |
| 2007/0014368 A1 | 1/2007 | MacInnis et al. | |
| 2008/0019605 A1 | 1/2008 | Yea et al. | |
| 2008/0123740 A1 | 5/2008 | Ye | |
| 2008/0204600 A1 | 8/2008 | Xu et al. | |
| 2009/0016451 A1 | 1/2009 | Chen | |

FOREIGN PATENT DOCUMENTS

| | | |
|---|---|---|
| JP | 09-130648 | 5/1997 |
| JP | 2006-287848 | 10/2006 |
| JP | 2007-221208 | 8/2007 |
| JP | 2009-095004 | 4/2009 |

OTHER PUBLICATIONS

Xiong,Xu,Wu,& Li,"Adaptive MCTF based on Correlation Noise Model for SNR Scalable Video Coding,"2006 IEEE International Conference on Multimedia and Expo,Jul. 9, 2006, p. 1865-1868.

\* cited by examiner

TABLE 1
PARAMETER VALUES FOR THE THREE PREDICTION SCHEMES

| | $a_2$ | $a_1$ | $a_0$ | $b_2$ | $b_1$ | $c$ |
|---|---|---|---|---|---|---|
| scheme (1) | 0.1941 | -0.0701 | 4.4724 | - | - | - |
| scheme (2) | 0.2439 | -0.9529 | - | 25.4279 | -23.3943 | 9.3214 |

MOTION-COMPENSATED TEMPORAL FILTERING BASED ON VARIABLE FILTER PARAMETERS

TECHNICAL FIELD

Embodiments pertain to systems and devices for, and methods of, motion-compensated temporal filtering based on variable filter parameters.

BACKGROUND

In video coding data, compression may be achieved by removing temporal and/or spatial redundancies. Video coding may use prediction and/or block-based motion compensation to reconstruct an approximation of the video data with minimal bits. Prediction-based compensation may use data in the current frame or in one or more previous and/or neighboring frames.

SUMMARY

Embodiments include systems and devices for, and methods of, motion-compensated temporal filtering based on variable filter parameters. For example, a method embodiment includes (a) determining, by a processor having memory, a pixel-related residue image based on a set of differences between a current pixel intensity of a current frame and a corresponding pixel intensity of a previous frame, wherein the corresponding pixel intensity is augmented by a motion-compensated vector of the previous frame; (b) determining an intensity weight based on the determined pixel-related residue image and a temporal filtering parameter; and (c) filtering the pixel intensity of the current frame based on the determined intensity weight and the motion compensated vector of the previous frame. Optionally, the temporal filtering parameter may be based on the determined set of residue images. Further, the temporal filtering parameter may be based on a histogrammed set of square-rooted determined pixel-related residue images. The histogrammed set of square-rooted determined pixel-related residue images may also be based on a mode of the histogrammed set of square-rooted determined pixel-related residue images. In some embodiments the histogrammed set of square-rooted determined pixel-related residue images may be further based on a portion, e.g., a one-sided tail portion, of the histogrammed set of square-rooted determined pixel-related residue images.

Embodiments include motion-compensated temporal filtering where the filtering parameter is a spatial statistical representation of at least one of: intensity and the motion vector. Optionally, the filtering parameter may be based on a variance of image intensity within a region about the current pixel. In another embodiment the filtering parameter may be based on a variance of at least one directional component of a motion vector within a region associated with the current pixel. Optionally, the filtering parameter may be based on a variance of the current pixel intensity of the current frame and a variance of the motion vector within a region associated with the current pixel.

Another exemplary method embodiment of a motion-compensated temporal filtering may include the steps of: (a) determining, by a processor having memory, a pixel-related residue image based on a set of differences between a current pixel intensity of a current frame and a corresponding pixel intensity of a previous frame, wherein the corresponding pixel intensity is augmented by a motion-compensated vector of the previous frame; (b) determining a set of intensity weights based on the determined pixel-related residue image and a temporal filtering parameter; (c) determining a set of spatial weights based on a set of neighboring pixels; and (d) filtering the pixel intensity of the current frame based on the set of determined intensity weight, the set of determined spatial weight, and the motion compensated vector of the previous frame. Optionally, the set of spatial weights may be further based on a spatial candidate set comprising a plurality of motion compensated vectors of the previous frame. The spatial candidate set may be further based on a set of neighboring pixels where the weight is attenuated distal from the pixel around which the intensity vector is being determined.

Some embodiments pertain to devices for motion-compensated temporal filtering, for example, the device embodiment may comprise: a processor and addressable memory, wherein the processor is configured to: (a) determine a pixel-related residue image based on a set of differences between a current pixel intensity of a current frame and a corresponding pixel intensity of a previous frame, the corresponding pixel intensity augmented by a motion-compensated vector of the previous frame; and (b) determine an intensity weight based on the determined pixel-related residue image and a temporal filtering parameter; and (c) filter the pixel intensity of the current frame based on the determined intensity weight and the motion compensated vector of the previous frame. In some embodiments, the processor may be further configured to determine a set of spatial weights based on a set of neighboring pixels.

Some embodiments may include a computer-readable non-transitory medium having computer-executable instructions stored thereon which, when executed by a computer, configure the computer to: (a) determine a pixel-related residue image based on a set of differences between a current pixel intensity of a current frame and a corresponding pixel intensity of a previous frame, the corresponding pixel intensity augmented by a motion-compensated vector of the previous frame; (b) determine an intensity weight based on the determined pixel-related residue image and a temporal filtering parameter; and (c) filter the pixel intensity of the current frame based on the determined intensity weight and the motion compensated vector of the previous frame.

BRIEF DESCRIPTION OF THE DRAWINGS

Embodiments are illustrated by way of example, and not limitation, in the figures of the accompanying drawings, and in which.

DETAILED DESCRIPTION

Figure 1:
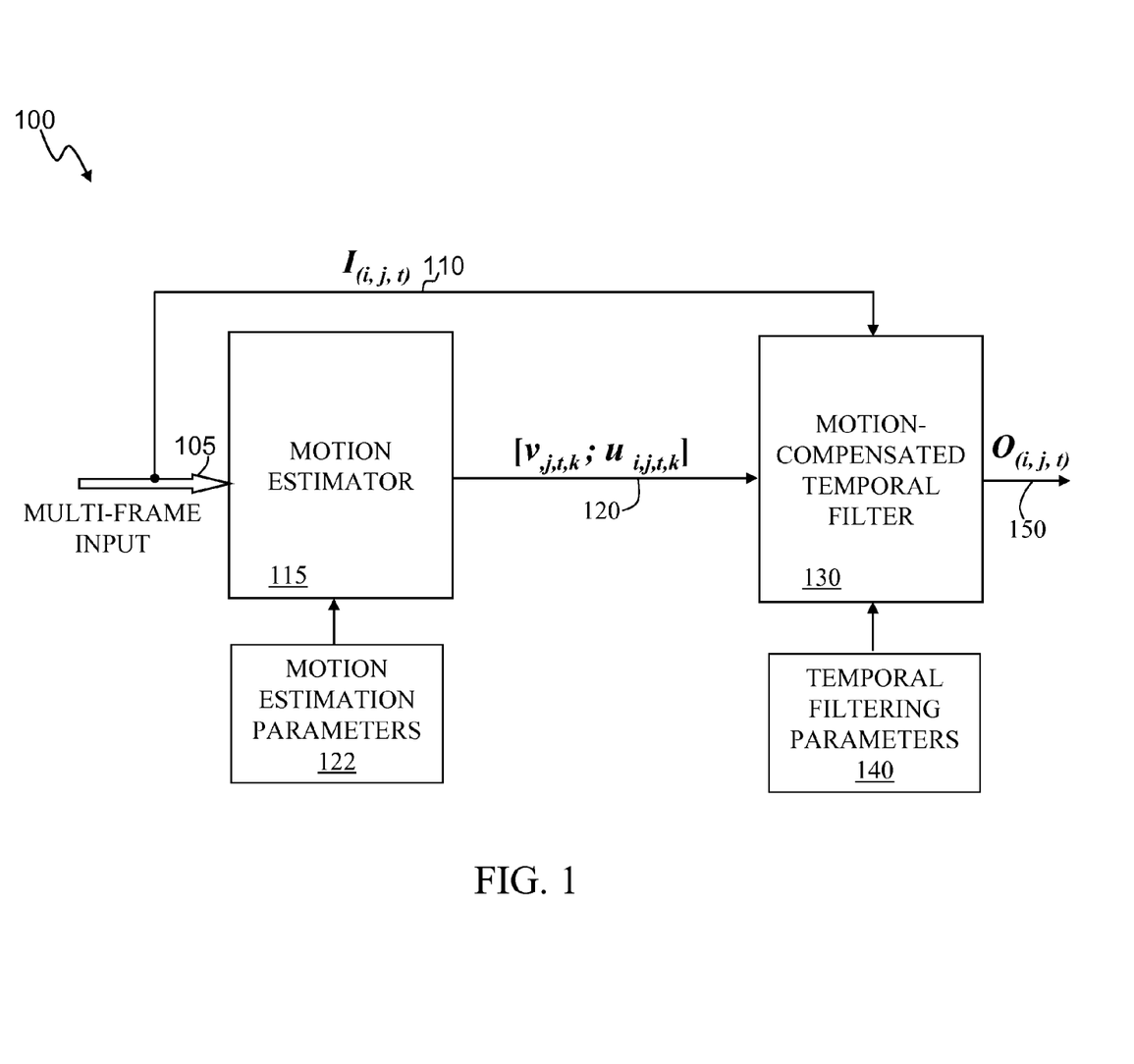
FIG. 1 is a functional block diagram depicting an embodiment of a temporal filtering system.

Disclosed are systems and devices for, and methods of, temporal filtering of pixels, or subpixels, of frames based on frame-to-frame pixel residues. FIG. 1 is an exemplary functional block diagram depicting an embodiment of a temporal filtering system 100. Embodiments of the temporal filtering system 100 may be executed in real time or near real time. One or more frames 105 may be received, read, or accessed, that may carry pixels in a current frame. A motion estimator 115 may be based on a set of one or more estimated motion vectors of one or more previous frames and a set of motion estimation parameters 122. A set of one or more motion vectors 120 may comprise the motion vectors between one or more previous frames and a current frame. The set of one or more motion vectors may be generated and passed to a motion-compensated temporal filter (MCTF) 130. A pixel may be denoted in the current frame to be $I(i,j,t)$ 110 and previous frame to be $I(i,j,t-1)$. The MCTF 130 is depicted as determining a filtered intensity vector 150, $O(i,j,t)$, based on a set of temporal filtering parameters 140, the set of one or more motion vectors 120, $v_{i,j,t,k}$, $u_{i,j,t,k}$, and the current frame pixel 110, $I(i,j,t)$.

Figure 2:
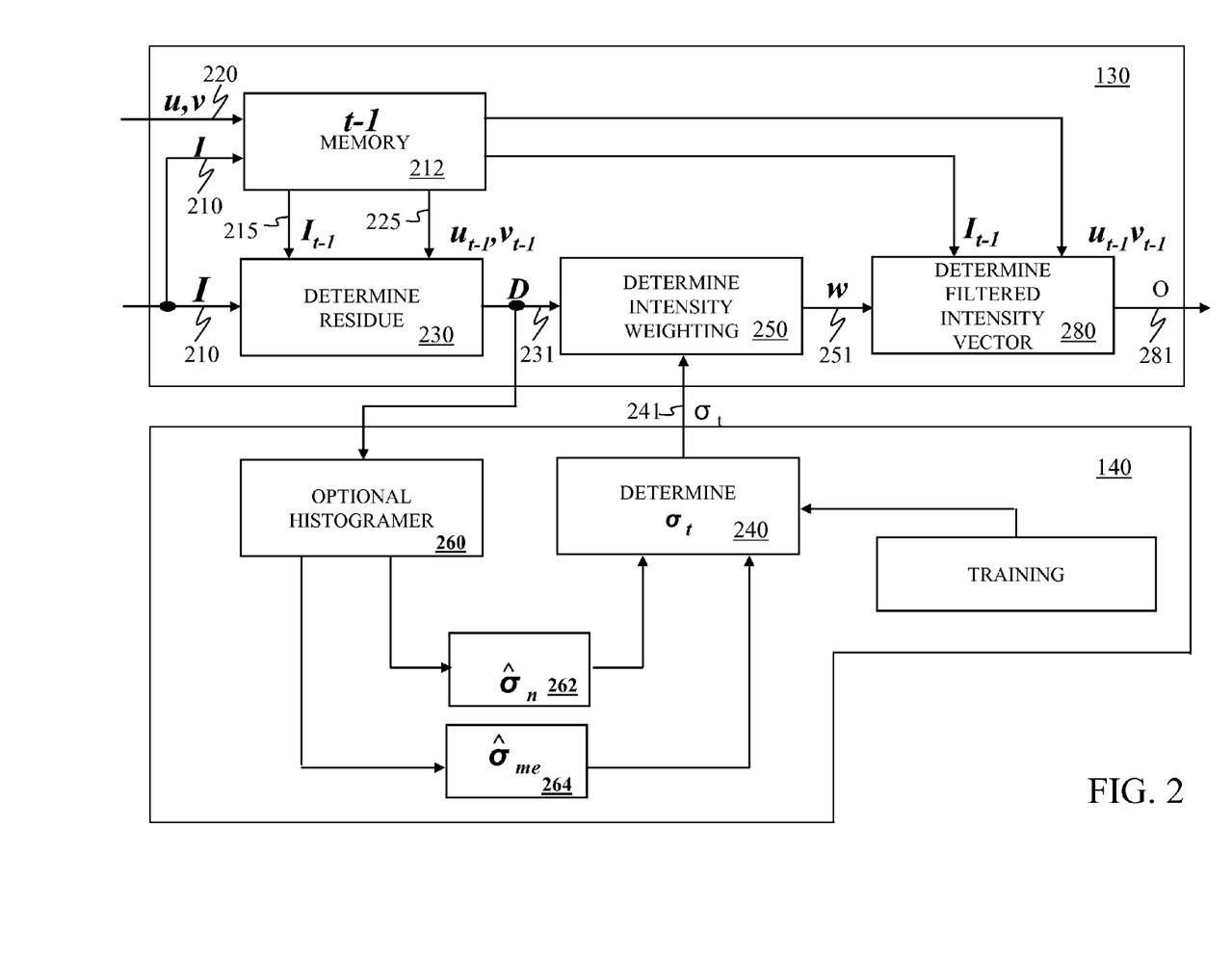
FIG. 2 depicts a functional block diagram of an exemplary motion-compensated temporal filtering system.

FIG. 2 depicts a functional block diagram of an exemplary motion-compensated temporal filter 130 having, as input, temporal filtering parameters 140. In this depicted embodiment, the current pixel 210, e.g., $I(i,j,t)$, and motion vectors 220, u, v, may be stored in memory 212, for example, a delay buffer. Once stored in memory 212, the current pixel 210, $I(i,j,t)$, may then have available from the previous frame both $I(i,j,t-1)$ 215 and $u_{t-1}v_{t-1}$ 225. A pixel-related residue image 231, $D_{i,j,t-1}$, may then be determined (block 230) based on a pixel of the current frame 210, $I(i,j,t)$, the spatially related pixel of the previous frame 215, $I(i,j,t-1)$, and the motion vectors 225, $u_{t-1}$, $v_{t-1}$, from the previous frame to current frame. An intensity weight 251, $w_{i,j,t-1}$, may be determined (block 250) based on the pixel-related image residue, $D_{i,j}$, 231, and a temporal filtering parameter 241, $\sigma_t$. In some embodiments, the temporal filtering parameter 241, $\sigma_t$, may be generated (block 240) based on offline training, or optionally the temporal filtering parameter 241, $\sigma_t$, may be generated and/or revised based on a set of previously determined image residues. In some embodiments, a filtered pixel-related intensity vector 281, $O(i,j,t)$, may be determined (block 280) based on the intensity weight 251, w, the intensity vector of the previous frame 215, $I(i,j,t-1)$, and the associated motion vectors 225, $u_{t-1}$, $v_{t-1}$, from the previous frame, t-1, to the current frame, t.

In some embodiments, the temporal filtering parameter 241, $\sigma_t$, may be revised or updated concurrently with image processing and pixel filtering where, for example, the image residue 231, D, may be passed to an optional histogrammer 260, i.e., defined frequency bins may be populated via tracking the count of the frames and apportioning according to the resulting square-root of each image residue 231, D, in the count according to a particular bin range. An estimate of the standard deviation of the square-root of the residue 262, $\hat{\sigma}_n$, may then be determined based on the mode of the histogrammed data. In one embodiment, an estimate of a motion compensation error 264, $\hat{\sigma}_{me}$ may be determined based on an upper tail percentage of the histogrammed data. The estimate of a motion compensation error 264, $\hat{\sigma}_{me}$ may be combined with $\hat{\sigma}_n$ 262, e.g., in a second order polynomial function, to determine the temporal filter parameter, $\sigma_t$.

The motion-compensated temporal filter may first perform motion compensation of the pixel of the current frame based on the estimated motion vectors from the previous frame. Then the output of MCTF may be a weighted combination of the motion-compensated previous frame pixel and the spatially related pixel of the current frame. Motion vectors between a previous frame and current frame, u, v, may be expressed relative to a pixel, I, of the previous frame t-1, i.e., relative to $I(i,j,t-1)$, as $v_{i,j,t-1}$ and $u_{i,j,t-1}$. The averaging window for determining the image pixel residue may be expressed as d, where d represents half of the averaging window length in either direction. The temporal filtering parameter $\sigma_t$ is the filtering parameter applied to temporally smooth the output pixels. The output of MCTF, i.e., $O(i,j,t)$, may be determined according to the following:

$$O(i,j,t) = \frac{w_{i,j,t-1}I(i+v_{i,j,t-1},\ j+u_{i,j,t-1},\ t-1) + I(i,j,t)}{1 + w_{i,j,t}} \quad [1]$$

where the weight, $w_{i,j,t-1}$, may be determined according to the following:

$$w_{i,j,t-1} = \exp\{-D_{i,j,t-1}/2\sigma_t^2)\}; \quad [2]$$

and, where the image pixel residue D for a range of ±d pixels in both spatial directions about the reference pixel $I(i,j,t)$, applying the motion vectors, u,v, from $I(i,j,t)$ to $I(i,j,t-1)$, may be determined according to the following:

$$D_{i,j,t-1} = \quad [3]$$

$$\frac{1}{(2d+1)^2} \sum_{m=i-d}^{i+d} \sum_{n=j-d}^{j+d} (I(m,n,t) - I(m+v_{i,j,t-1}, n+u_{i,j,t-1}, t-1))^2$$

For a particular D, increasing $\sigma_t$ provides more de-noising power, while concurrently tending toward over-smoothing, and potentially producing image artifacts. Embodiments determine values of $\sigma_t$ that provide de-noising effects while not over-smoothing and/or generating artifacts.

The filtering parameter, $\sigma_t$, may be treated as spatially invariant, i.e., uniform for an entire frame, but may change over frames, i.e., temporally variant. The global properties of input frames and their sequences, such as their noise statistics, may affect the $\sigma_t$. An effective $\sigma_t$ value may be defined as the one maximizing the peak signal-to-noise ratio between the filtered image and a ground truth. Alternatively, a metric such as the Structure Similarity Index (SSIM) may be applied to assess effective values of $\sigma_t$. In one embodiment, determining values of $\sigma_t$ may be done a priori via trials that may be carried on sequences that have various texture complexity and motion complexity.

Although an averaged numerically optimal $\sigma_t$s may be closely related to noise level, a factor that may model the deviation from the average for each frame may be lacking. For frames with $\sigma_t$s above the average, the motion compensation errors may be, in general, small. Images having $\sigma_t$s that are below the average in each level may correspond to large motion compensation errors in the compensated previous frames. Therefore, an additional feature related to the motion compensation error may be used for predicting the numerically optimal $\sigma_t$.

Figure 3:
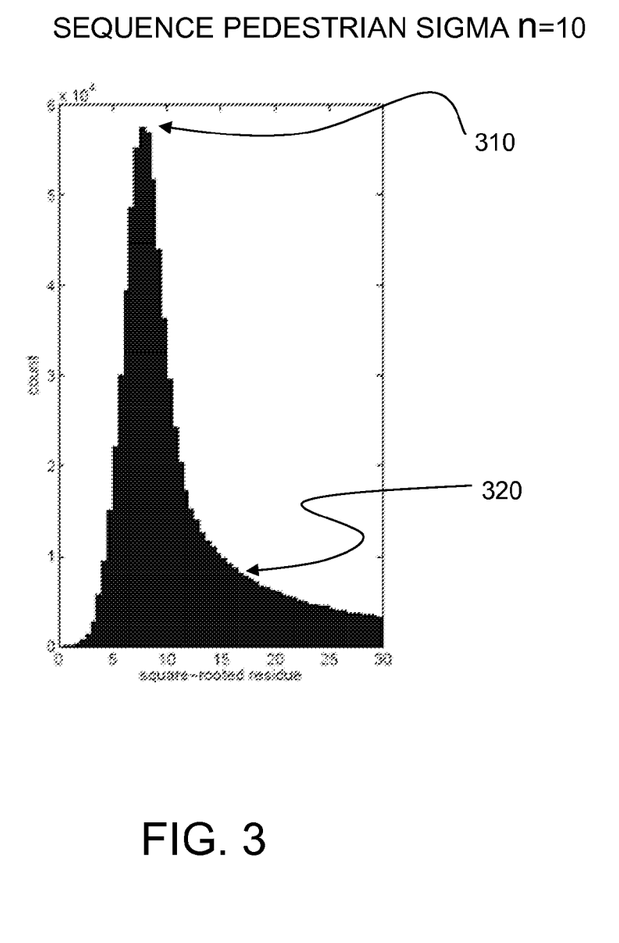
FIG. 3 depicts an example of a histogrammed, square-rooted, residue image.

FIG. 3 provides an example of a histogram of a square-rooted residue image with the same noise level which corresponds to a large motion error. Thus, the percentage of the tail 320 as an indicator of the motion compensation error may be considered in constructing $\sigma_t$. The tail 320 may be defined as the portion larger than three times the mode 310. Prediction of the $\sigma_t$ may depend on the noise level and the motion compensation error. The noise level may be estimated using the mode of the histogram of the square-rooted residue image, denoted by $\hat{\sigma}_n$, and the motion compensation error may be estimated using the tail percentage of the same histogram, denoted by $\sigma_{me}$. Derivations below at equation 31 suggest the form as the functional form for prediction, but in practice, the mode and tail percentage may not correspond exactly to the $\sigma_n$ and $\sigma_{me}$. So, a second-order polynomial function of $\sigma_n$ may be applied for the prediction of $\sigma_t$. Optionally, a second-order polynomial function of $\sigma_n$ and $\sigma_{me}$ may also be applied for the prediction of $\sigma_t$. The following are exemplary functional forms for $\sigma_t$ prediction:

$$\sigma_t = a_2 \hat{\sigma}_n^2 + a_1 \hat{\sigma}_n + a_0; \text{ and} \quad [4]$$

$$\sigma_t = a_2 \hat{\sigma}_n^2 + a_1 \hat{\sigma}_n + b_2 \hat{\sigma}_{me}^2 + b_1 \hat{\sigma}_{me} + c. \quad [5]$$

Figure 4:
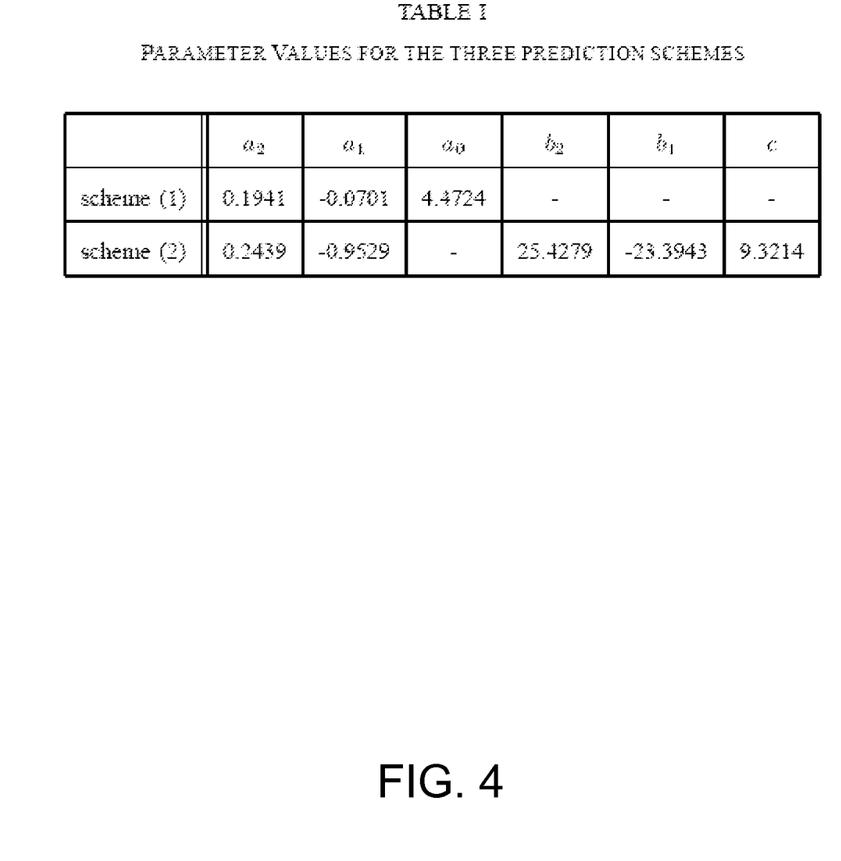
FIG. 4 depicts a table of parameter values for exemplary prediction schemes.

The determining of the parameters $a_2$, $a_1$, $a_0$, for the first polynomial-based predictor, and/or $a_2$, $a_1$, $a_0$, $b_2$, $b_1$, and c for the second polynomial-based predictor, may be accomplished via a training process. The polynomial parameters defining fitted curves of two exemplary prediction methods are listed as training output in Table 1 of FIG. 4. A testing of the effectiveness of the resulting predictive polynomials may be conducted. The polynomial parameters, the noise statistics, and the motion error statistics—computed from the output—may be used to calculate the $\hat{\sigma}_t$ and then the $\hat{\sigma}_t$ may be used to compute the output of temporal filtering.

Embodiments may include one or more processing modules where they comprise a processor, such as a central processing unit (CPU), and a memory store, such as addressable memory.

Multi-Candidate Temporal Filtering

In some embodiments, the motion estimation may give incorrect correspondence between the current pixel and the pixel in the previous frame, and it may be possible that the correct corresponding pixel may be within the neighborhood of the incorrect pixel. Therefore, taking multiple candidates into account, multiple candidates may help recover the correct temporal correspondence. Some embodiments may consider only one pixel in the previous frame for filtering each pixel in the current frame. In another embodiment, the temporal filtering may be extended to consider multiple pixels in the previous frame for filtering one pixel in the current frame. These pixels may be referred to as candidates. Multiple candidates may have more de-noising power and may aid in correcting for the motion error.

Therefore, in some embodiments, the temporal filtering may consider multiple pixels in a previous frame for filtering the current pixel in the current frame. This may be in addition to considering only one pixel in the previous frame for filtering each pixel in the current frame. In a multi-pixel embodiment, the filtered intensity vector may be based additionally on a weighting, e.g., a spatial Gaussian distribution, to further determine the frame weighting. If applied, the spatial Gaussian may be positioned to attenuate the value of the weighting factor as the distance increases from the current pixel of the current frame.

Figure 5:
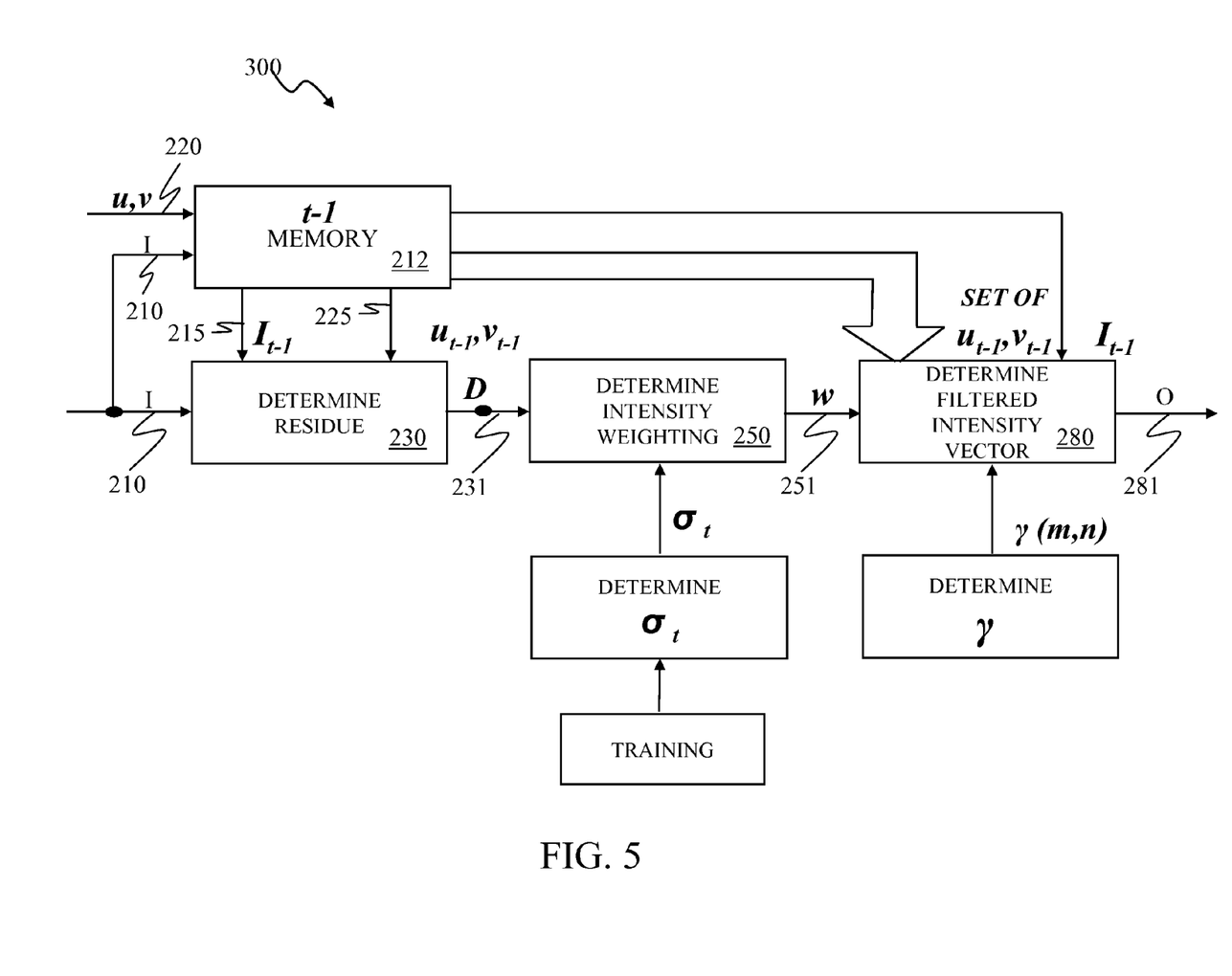
FIG. 5 is a functional block diagram depicting an embodiment of a motion-compensated multi-candidate temporal filtering system.

FIG. 5 depicts a functional block diagram of an exemplary motion-compensated multi-candidate temporal filter 300 having input of temporal filtering parameters. The temporal filtering may consider multiple pixels in a previous frame for filtering the current pixel in the current frame. FIG. 5 depicts a pixel, e.g., I(i,j,t) 210 and a set of candidate pixels depicted by motion vectors 220, that may be stored in memory 212 e.g., a buffer. Once stored in memory 212, the current pixel I(i,j,t) may then have available the previous frame, I(i,j,t−1) and the set of $u_{t-1}$, $v_{t-1}$ 225 as a candidate set. A residue image, D 231 may then be calculated (block 230) based on the current frame, I(i,j,t) 210, the previous frame, I(i,j,t−1) 215, and the motion vectors, $u_{t-1}$, $v_{t-1}$ 225, between the previous frame and current frame. An intensity weight, w 251, may be calculated (block 250) based on the residue image 231 and a temporal filtering parameter, $\sigma_t$, 241. In some embodiments, a filtered intensity vector, O(i,j,t) 281, may be determined (block 280) based on the intensity weight, w 251, the intensity vector of the previous frame, I(i,j,t−1) 215, the set of motion vectors, $u_{t-1}$, $v_{t-1}$ 225—between the previous frame and current frame—and a spatial Gaussian kernel $\gamma$(m,n).

An exemplary multi-candidate filtering scheme may be expressed where the output of the filter may be given by:

$$O(i, j, t) = \frac{\sum_{m,n \in N(i+v_{i,j,t-1}, u_{i,j,t-1})} \gamma(m, n) w_{m,n,t-1} I(m, n, t-1) + I(i, j, t)}{1 + \sum_{m,n \in N(i+v_{i,j,t-1}, u_{i,j,t-1})} \gamma(m, n) w_{m,n,t-1}} \quad [6]$$

where the weight $w_{m,n,t-1}$ may be defined by $$w_{m,n,t-1} = \exp\{-D_{m,n,t-1}/(2\sigma_t^2)\}; \text{ the residue may be defined by:} \quad [7]$$

$$D_{m,n,t-1} = \frac{1}{(2d+1)^2} \sum_{m'=m-d}^{m+d} \sum_{n'=n-d}^{n+d} (I(m', n', t) - I(m' + v_{i,j,t-1}, t-1, n' + u_{i,j,t-1}, t-1))^2; \quad [8]$$

where $$N(i+v_{i,j,t-1}, j+u_{i,j,t-1}) \quad [9]$$

denotes the neighbor of point $$(i+v_{i,j,t-1}, j+u_{i,j,t-1}). \quad [10]$$

In addition, $\gamma$(m,n) may be based on a spatial Gaussian kernel, i.e., $$\gamma(m,n) = \exp\{-((m-(i+v_{i,j,t-1}))^2 + (n-(j+u_{i,j,t-1}))^2)/2\sigma_s^2\} \quad [11]$$

where $\sigma_s$ is the standard deviation parameter for the kernel. For single candidate, the optimal $\sigma_t$ may have been searched. For the multi-candidate, the jointly optimal $\sigma_t$ and $\sigma_s$ may have been searched.

Locally Adaptive Filtering

Figure 6:
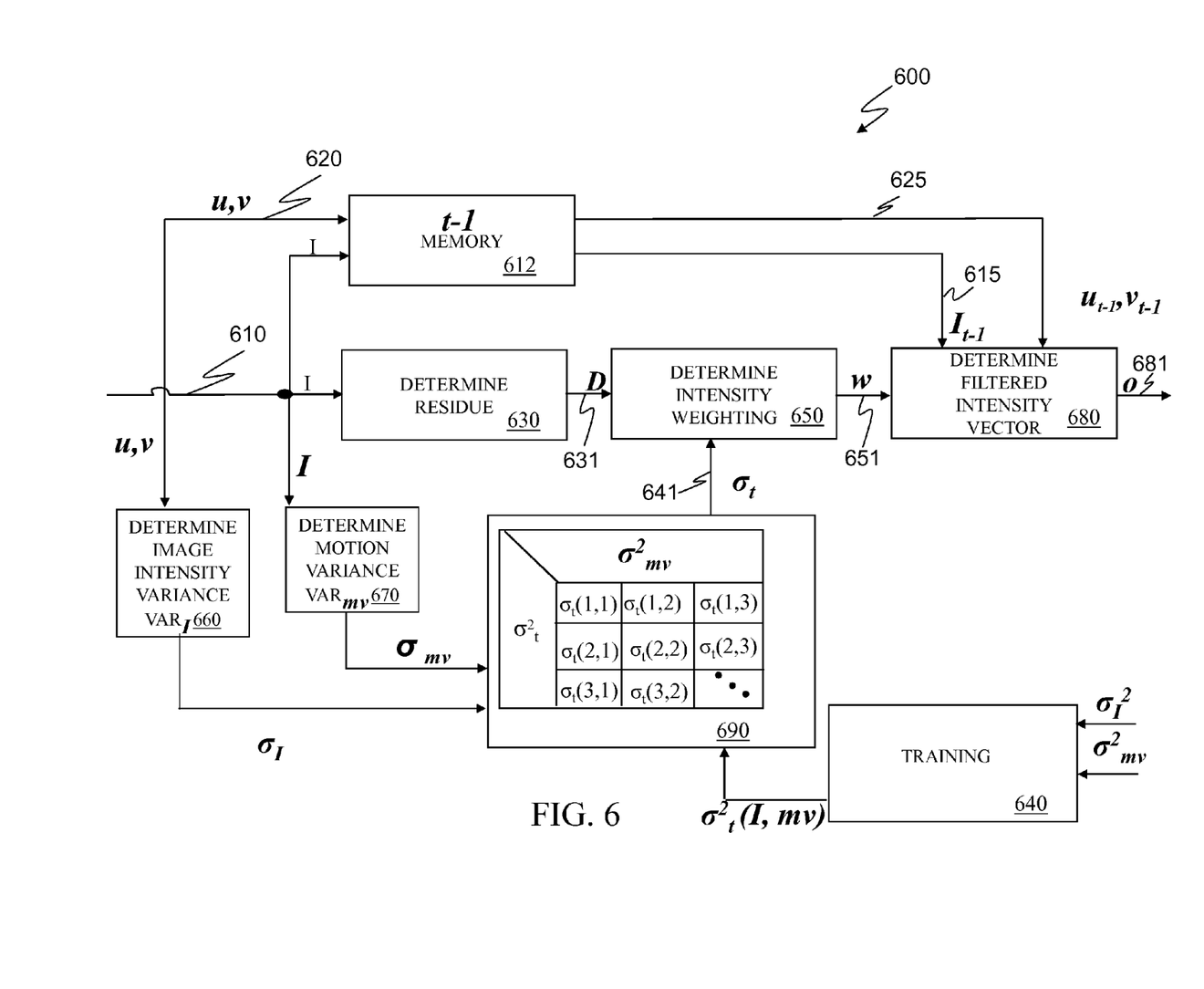
FIG. 6 is a functional block diagram depicting an embodiment of a temporal, locally adaptive, filtering system.

Filtering parameters for the motion-compensated temporal filtering may be locally adaptive. That is, one may predict the $\hat{\sigma}_t$ for each pixel in the image depending on local features of the input frame. FIG. 6 is an exemplary functional block diagram depicting an embodiment of a temporal, locally adaptive, filtering system 600. In this depicted embodiment, the current pixel 610, e.g., I(i,j,t), and motion vectors 620, u, v, may be stored in memory (block 612), e.g., a buffer. Once stored in memory (block 612), the current pixel 610, I(i,j,t), may then have available from the previous frame both I(i,j,t−1) 615 and $u_{t-1}$, $v_{t-1}$ 625. A pixel-related residue image 631, $D_{i,j,t-1}$, may then be determined (block 630) based on a pixel of the current frame 610, I(i,j,t), the spatially related pixel of the previous frame 615, I(i,j,t−1), and the motion vectors 625, $u_{t-1}$, $v_t$, from the previous frame to current frame. An intensity weight 651, $w_{i,j,t-1}$, may be determined (block 650) based on the pixel-related image residue, $D_{i,j}$, 631, and a temporal filtering parameter 641, $\sigma_t$. Each pixel in the image may have a different predicted $\sigma_t$ depending on local features of the input frame. In some embodiments, a filtered pixel-related intensity vector 681, O(i,j,t), may be determined (block 680) based on the intensity weight 651, w, the intensity vector of the previous frame 615, I(i,j,t−1), and the associated motion vectors 625, $u_{t-1}$, $v_{t-1}$, from the previous frame, t−1, to the current frame, t.

For example, the local features may comprise a local variance of the image intensity, $Var_I(i,j,t)$ and a local variance of each of the motion vectors, $Var_u(i,j,t)$ and $Var_v(i,j,t)$. The local variance of the image intensity, $Var_I(i,j,t)$, may be determined 660 based on subtracting the squared sum across the 2-D local window of the intensity vector of the current frame, I(m,n,t), divided by the square of unity plus the local window size, from the sum of the square of the intensity vector of the current frame, I(m,n,t), divided by the square of unity plus the local window size.

Also for example, the local variances of the motion vector for each component direction, $Var_u(i,j,t)$ and $Var_v(i,j,t)$, may be determined 660 by subtracting the square of the sum of the motion vector of the current frame, divided by the sum of unity plus the local window size, from the sum of the square of the motion vector divided by the square of unity plus the local window size (block 690). A total motion vector variance, $Var_{MV}(i,j,t)$ may then be determined by adding each direction vector, i.e., $Var_u(i,j,t) + Var_v(i,j,t)$.

The filtering parameter $\hat{\sigma}_t$ may therefore be predicted according to local features. For example, the local variance of the image intensity, $Var_I(i,j,t)$, may be determined 660 according to the following:

$$Var_I(i, j, t) = \frac{1}{(2d+1)^2} \sum_{m=i-d}^{i+d} \sum_{n=j-d}^{j+d} I(m, n, t)^2 - \left[\frac{1}{(2d+1)^2} \sum_{m=i-d}^{i+d} \sum_{n=j-d}^{j+d} I(m, n, t)\right]^2. \qquad [12]$$

Also for example, the local variance of the motion vector. The variance of each direction, u, v, of the motion vector, MV, may be determined 670 by:

$$Var_u(i, j, t) = \frac{1}{(2d+1)^2} \sum_{m=i-d}^{i+d} \sum_{n=j-d}^{j+d} u(m, n, t)^2 - \left[\frac{1}{(2d+1)^2} \sum_{m=i-d}^{i+d} \sum_{n=j-d}^{j+d} u(m, n, t)\right]^2; \qquad [13]$$

and $$Var_v(i, j, t) = \frac{1}{(2d+1)^2} \sum_{m=i-d}^{i+d} \sum_{n=j-d}^{j+d} v(m, n, t)^2 - \left[\frac{1}{(2d+1)^2} \sum_{m=i-d}^{i+d} \sum_{n=j-d}^{j+d} v(m, n, t)\right]^2 \qquad [14]$$

The total variance, $Var_{MV}$, may be given by $$Var_{MV}(i,j,t) = Var_u(i,j,t) + Var_v(i,j,t). \qquad [15]$$

A test set for the predicting of the filtering parameter $\hat{\sigma}_t$ according to local features may be a synthetic dataset with, for example, additive Gaussian noise, std. dev.=10, and a compression rate=20 Mbps.

Additional features that may be considered for predicting the filtering parameter $\hat{\sigma}_t$—according to local features—include, for example, normalized cross-correlation and mean-square difference. Additionally, in one embodiment, the use of other features for classification, such as gradient features which corresponds to edges, histogram features such as histogram similarity measurements—e.g., Bhattacharyya distance or Mahalanobis distance—or other spatial noise statistics may be used.

Mathematical Derivations Supporting the Filtering Parameter

A prediction process depends on the existence and uniqueness of the optimal $\sigma_t$. The numerically optimal $\sigma_t$ may relate to the noise level and motion compensation error. The numerically optimal $\sigma_t$ for motion-compensated temporal filtering may be based on minimizing the mean-square error. For example, a point $x_0$ in a scene at time t, i.e., the current frame, may be considered. The observed image pixel may be $y_0$ where $y_0 = x_0 + n_0$. Similarly, the corresponding point may be assumed $x_1$ in time t−1 and the observed pixel may be $y_1 = x_1 + n_1$. $n_0$ and $n_1$ may be additive Gaussian noise with zero mean and having a standard deviation, $\sigma_n$. A motion transformation M between $x_1$ and $x_0$, i.e., $x_1 = M(x_0)$ may be considered. The motion transformation may be invertible. An estimate of the motion transformation $\hat{M}$ the motion estimation stage may be obtained, then the inverse of the estimated motion may be applied to the t−1 frame, i.e., $$\hat{M}^{-1}(y_1) = \hat{M}^{-1}(x_1+n_1) = \hat{M}^{-1}(M(x_0)+n_1). \qquad [16]$$

A filtering process may be expressed as:

$$\hat{x}_0 = \frac{y_0 + w\hat{M}^{-1}(y_1)}{1+w};$$

where w may be the weighting value. If the motion estimation is correct, i.e., $\hat{M}=M$, the above equation becomes $\hat{M}^{-1}(y_1) = x_0 + \hat{M}^{-1}(n_1)$. Since the motion transformation does not change the statistics of the noise, $\hat{M}^{-1}(n_1) \triangleq n_0'$ is denoted, which is independent and identically distributed (i.i.d) with respect to $n_0$. So, for the situation of correctly estimated motion, the optimal weight, w, when defined as the weight that results in the largest de-noising power, is unity. Accordingly, the de-noised result will have noise variance of $\sigma_n^2/2$.

The motion estimation is not always correct, and when the motion transformation is not correct, one may assume the difference between the true value and the compensated value to be $\Delta x$, i.e., $\hat{M}^{-1}M(x_0) - x_0 = \Delta x$. Accordingly:

$$\hat{M}^{-1}(y_1) = x_0 + \Delta x + n_0' \qquad [17]$$

The correct motion estimation is a special case when $\Delta x=0$. However, for the incorrect motion estimation, the filtered result is thus $$\hat{x}_0 = \frac{x_0 + n_0 + w(x_0 + \Delta x + n_0')}{1+w} \qquad [18]$$

$$= x_0 + \frac{n_0 + wn_0'}{1+w} + \frac{w\Delta x}{1+w} \qquad [18.1]$$

One may define the filtering error for pixel $x_0$ as the expected mean-square error over the probability distribution of the Gaussian noise, i.e., $$error(x_0) \equiv E_n[(\hat{x}_0 + x_0)^2] \qquad [19]$$

$$= E_n\left[\left(\frac{n_0 + wn_0'}{1+w} + \frac{w\Delta x}{1+w}\right)^2\right] \qquad [19.1]$$

$$= E_n\left[\left(\frac{n_0 + wn_0'}{1+w}\right)^2\right] + \left(\frac{w\Delta x}{1+w}\right)^2 + 2\frac{w\Delta x}{1+w} \qquad [19.2]$$

$$E_n\left[\frac{n_0 + wn_0'}{1+w}\right].$$

With $n_0$ and $n_0'$ being independent and identically distributed (i.i.d) with zero mean and standard deviation $\sigma_n^2$, the above expected mean-square error equation can be simplified as:

$$E_n[(\hat{x}_0 - x_0)^2] = \frac{1}{(1+w)^2} E_n[n_0^2 + w^2 n_0'^2 + 2wn_0 n_0'] + \left(\frac{w\Delta x}{1+w}\right)^2 \quad [20]$$

$$= \frac{1+w^2}{(1+w)^2} \sigma_n^2 \frac{w^2 \Delta x^2}{(1+w)^2} \quad [20.1]$$

A partial derivative with respect to w, yields the following:

$$\frac{\partial En}{\partial w} = \frac{2w(1+w) - 2(1+w^2)}{(1+w)^3} \sigma_n^2 + \frac{2w(1+w) - 2w^2}{(1+w)^3} \Delta x^2. \quad [22]$$

If the error is minimized for weight, then the partial derivative with respect to weight is zero, i.e., $$\frac{\partial En}{\partial w} = 0,$$

which in turn yields $$[w(1+w)-(1+w^2)]\sigma_n^2 = [w(1+w)-w^2]\Delta x^2, \quad [23]$$

from which the optimal weight, w*, is derived and given by $$w^* = \frac{\sigma_n^2}{\sigma_n^2 + \Delta x^2}, \quad [24]$$

which is equivalent to $$\frac{1}{w^*} = 1 + \frac{\Delta x^2}{\sigma_n^2}. \quad [25]$$

When motion estimation is correct, $\Delta x = 0$, then $w = 1$. Another case where $\Delta x = 0$, meaning that the pixel is located in a uniform area and the wrong motion compensation does not cause a difference, the weight is still unity. When $\sigma_n$ increases, w increases, resulting in more de-noising power. Accordingly, the upper bound of the weight is unity.

Local averaging may be an approximation to taking the expectation, and so the weight, w, may be expressed as: $w=\exp\{-d/(2\sigma_t^2)\}$ where d, which is an expectation and not the one-half the window distance applied in a previous section, may be expressed as:

$$d = E_n[(\hat{M}^{-1}(y_1)-(y_0)^2] = E_n[(\Delta x + n_0' - n_0)^2] = \Delta x^2 + 2\sigma_n^2. \quad [26]$$

The above equation for d has an underlying assumption that $\Delta x$ varies little within a small local region. Therefore, the inverse of the weighting factor may be expressed as $$\frac{1}{w} = \exp\{(\Delta x^2 + 2\sigma_n^2)/(2\sigma_t^2)\} \quad [27]$$

Based on the Taylor Series of $e^x = 1 + x + x^2/2 \ldots$, one may approximate the above inverted weighting factor equation by a first order, e.g., $$\frac{1}{w} \cong 1 + \frac{\Delta x^2 + 2\sigma_n^2}{2\sigma_t^2} \quad [28]$$

Therefore the numerically optimal $\sigma_t$ should approximately satisfy the following:

$$\frac{\Delta x^2 + 2\sigma_n^2}{2\sigma_t^2} = \frac{\Delta x^2}{2\sigma_n^2}, \quad [29]$$

and the above relationship can be solved as $$2\sigma_t^2 = \frac{1}{2} 2\sigma_n^2 \left(\frac{2\sigma_n^2}{\Delta x^2} + 1\right) \quad [30]$$

$$= \frac{1}{2} \frac{d\sigma_n^2}{d - 2\sigma_n^2} \quad [30.1]$$

The above equation shows how the numerically optimal $\sigma_t$ relates to the noise level. That is, the larger the value of $\sigma_n$, then the larger the value of $\sigma_t$. The above equation also relates to $\Delta x$, or d, which can be spatially variant. If $\Delta x \gg \sigma_n$, the numerically optimal $\sigma_t$ may be given by $$\sigma_t = \frac{\sigma_n}{\sqrt{2}}.$$

In the case of $\Delta x \gg \sigma_n$, the value $\sigma_t$ increases linearly with the value of $\sigma_n$.

To define a uniform $\sigma_t$ for an entire frame, one may consider $\Delta x$ to be a random variable having a zero mean and a variance of $\sigma_{me}^2$. One may use the expected value of $\Delta x^2$ to approximate the $\sigma_t$, i.e., $$\sigma_t^2 = \frac{1}{2}\sigma_n^2\left(\frac{2\sigma_n^2}{E(\Delta x^2)} + 1\right) = \frac{1}{2}\sigma_n^2\left(\frac{2\sigma_n^2}{\sigma_{me}^2} + 1\right). \quad [31]$$

Definitions and notations are similar to the previous section. One may assume $\Delta x$ to be a random variable of zero mean and variance of $\sigma_{me}^2$. The filter weighting may be defined as in equation no. 7 (above), i.e., $$w = \exp\{-(\Delta x^2 + 2\sigma_n^2)/(2\sigma_t^2)\}. \quad [32]$$

One may define the normalized weight to be $$\rho = \frac{1}{1+w}.$$

Therefore the filter output may be expressed as:

$$\hat{x}_0 = \rho y_0 + (1-\rho)/\hat{M}^{-1}(y_1). \quad [33]$$

One may define the error as expected mean-square-error over both the distribution of additive noise and distribution of motion error, i.e., $E_{n,\Delta x}[(\hat{x}_0 - x_0)^2] = E_{n,\Delta x}[(\rho n_0 + (1-\rho)n_0' + (1-\rho)\Delta x)^2]$. [34]

Taking expectation on the noise first, one may arrive at the expectation, or objective function, expressed as:

$$E_{n,\Delta x}[(\hat{x}_0 - x_0)^2] = E_{\Delta x}\begin{bmatrix} ((1-\rho)^2 + \rho^2)\sigma_n^2 + \\ (1-\rho)^2 \Delta x^2 \end{bmatrix} \quad [35]$$

$$= E_{\Delta x}[2\rho^2 - 2\rho]\sigma_n^2 + \quad [35.1]$$

$$E_{\Delta x}[(1-\rho)^2 \Delta x^2] + \sigma_n^2.$$

A partial derivative of the above objective function with respect to $\sigma_t$, where the order of expectation and derivative are exchanged, has the following:

$$\frac{\partial E_{n,\Delta x}}{\partial \sigma_t} = E_{\Delta x}\left[4\rho \frac{\partial \rho}{\partial \sigma_t} - 2\frac{\partial \rho}{\partial \sigma_t}\right]\sigma_n^2 + E_{\Delta x}\left[2(1-\rho)\frac{\partial \rho}{\partial \sigma_t}\Delta x^2\right]. \quad [36]$$

The following approximations on $\rho$:

$$\rho = \frac{1}{1+w} = 1 - w + w^2 - w^3 \quad [37]$$

$$\cong 1 - w = 1 - \exp\{-(\Delta x^2 + 2\sigma_n^2)/(2\sigma_t^2)\} \quad [37.1]$$

$$\cong 1 - (1 - (\Delta x^2 + 2\sigma_n^2)/(2\sigma_t^2)) \quad [37.2]$$

$$= \frac{\Delta x^2 + 2\sigma_n^2}{2\sigma_t^2} \quad [37.3]$$

The two approximations are all based on Taylor series. Therefore, $$\frac{\partial \rho}{\partial \sigma_t} = -\frac{\Delta x^2 + 2\sigma_n^2}{\sigma_t^3} \quad [38]$$

Substituting the expression for $$\frac{\partial \rho}{\partial \sigma_t}$$

into the expression for $$\frac{\partial E_{n,\Delta x}}{\partial \sigma_t}$$

yields the following:

$$\frac{\partial E_{n,\Delta x}}{\partial \sigma_t} = E_{\Delta x}\begin{bmatrix} -4\frac{\Delta x^2 + 2\sigma_n^2}{2\sigma_t^2} \\ \frac{\Delta x^2 + 2\sigma_n^2}{\sigma_t^3} + \\ 2\frac{\Delta x^2 + 2\sigma_n^2}{\sigma_t^3} \end{bmatrix}\sigma_n^2 + E_{\Delta x}\begin{bmatrix} -2\left(1 - \frac{\Delta x^2 + 2\sigma_n^2}{2\sigma_t^2}\right) \\ \frac{\Delta x^2 + 2\sigma_n^2}{\sigma_t^3}\Delta x^2 \end{bmatrix}. \quad [39]$$

The above expression can be simplified as:

$$\frac{\partial E_{n,\Delta x}}{\partial \sigma_t} = \frac{2}{\sigma_t^5}\begin{bmatrix} (-E(\Delta x^4) - (E(\Delta x^2)\sigma_n^2 + 2\sigma_n^4)\sigma_t^2 - \\ 4\sigma_n^6 + 3E(\Delta x^4)\sigma_n^2 + E(\Delta x^6) \end{bmatrix} \quad [40]$$

Let $$\frac{\partial E_n, \Delta x}{\partial \sigma_t} = 0,$$

optimal $\sigma_t^2$ may be solved for as follows:

$$(\sigma_t^2)^* = \frac{4\sigma_n^6 - 3E(\Delta x^4)\sigma_n^2 - E(\Delta x^6)}{2\sigma_n^4 - E(\Delta x^2)\sigma_n^2 + E(\Delta x^4)} \quad [41]$$

So, the optimal variance, $(\sigma_t)^*$ and the associated square root, $\sigma_t$, relate to both the noise variance and second, fourth and sixth moment of motion error.

It is contemplated that various combinations and/or sub-combinations of the specific features and aspects of the above embodiments may be made and still fall within the scope of the invention. Accordingly, it should be understood that various features and aspects of the disclosed embodiments may be combined with or substituted for one another in order to form varying modes of the disclosed invention. Further, it is intended that the scope of the claimed invention (below), disclosed herein by way of examples, should not be limited by the particular disclosed embodiments described above.

What is claimed is:

1. A method of motion-compensated temporal filtering comprising:
   determining, by a processor having memory, a pixel-related residue image based on a set of differences between a current pixel intensity of a current frame and a corresponding pixel intensity of a previous frame, wherein the corresponding pixel intensity is augmented by a motion-compensated vector of the previous frame;
   determining an intensity weight based on the determined pixel-related residue image and a filtering parameter, wherein the filtering parameter provides, via minimizing a mean-square difference error, a de-noising effect based on noise level and motion compensation error;
   generating an optimal filtering parameter for motion-compensated temporal filtering by subsequently revising the filtering parameter based on a set of previously determined residue images via tracking a count of frames and apportioning according to a resulting square-root of each residue image of the set of previously determined residue images;
   filtering the pixel intensity of the current frame based on the determined intensity weight, the pixel intensity of the previous frame, a standard deviation parameter, and the motion compensated vector of the previous frame; and
   determining a filtered pixel intensity vector based on the filtered pixel intensity of the current frame, the generated optimal filtering parameter, and a spatial weighting distribution.

2. The method of claim 1 wherein the filtering parameter is a temporal filtering parameter based on offline training.

3. The method of claim 2 wherein the temporal filtering parameter is further based on a histogrammed set of square-rooted determined pixel-related residue images.

4. The method of claim 3 wherein the histogrammed set of square-rooted determined pixel-related residue images is based on a mode of the histogrammed set of square-rooted determined pixel-related residue images.

5. The method of claim 4 wherein the histogrammed set of square-rooted determined pixel-related residue images is further based on a portion of the histogrammed set of square-rooted determined pixel-related residue images.

6. The method of claim 1 wherein the filtering parameter is a spatial statistical representation of at least one of: intensity and the motion vector.

7. The method of claim 6 wherein the filtering parameter is based on a variance of image intensity within a region associated with the current pixel.

8. The method of claim 7 wherein the filtering parameter is based on a variance of at least one directional component of a motion vector within a region associated with the current pixel.

9. The method of claim 8 wherein the filtering parameter is based on a variance of the current pixel intensity of the current frame and a variance of the motion vector within a region associated with the current pixel.

10. A method of motion-compensated temporal filtering comprising:
   determining, by a processor having memory, a pixel-related residue image based on a set of differences between a current pixel intensity of a current frame and a corresponding pixel intensity of a previous frame, wherein the corresponding pixel intensity is augmented by a motion-compensated vector of the previous frame;
   determining a set of intensity weights based on the determined pixel-related residue image and a temporal filtering parameter, wherein the filtering parameter provides, via minimizing a mean-square difference error, a de-noising effect based on noise level and motion compensation error;
   determining a set of spatial weights based on a set of neighboring pixels;
   determining an optimal filtering parameter via attenuating the determined set of intensity weights based on the determined spatial weights and tracking a count of frames and apportioning according to a resulting square-root of each residue image of a set of previously determined residue images;
   filtering the pixel intensity of the current frame based on the set of determined intensity weight, the pixel intensity of the previous frame, a standard deviation parameter, the set of determined spatial weight, and the motion compensated vector of the previous frame; and
   determining a filtered pixel intensity vector based on the filtered pixel intensity of the current frame, the determined optimal filtering parameter, and a spatial weighting distribution.

11. The method of claim 10 wherein the set of spatial weights is further based on a spatial candidate set comprising a plurality of motion compensated vectors of the previous frame.

12. The method of claim 11 wherein the spatial candidate set is further based on a set of neighboring pixels wherein the weight is attenuated distal from the pixel around which the intensity vector is being determined.

13. A device comprising:
   a processor, configured to:
      determine a pixel-related residue image based on a set of differences between a current pixel intensity of a current frame and a corresponding pixel intensity of a previous frame, the corresponding pixel intensity augmented by a motion-compensated vector of the previous frame;
      determine an intensity weight based on the determined pixel-related residue image and a filtering parameter, wherein the filtering parameter provides, via minimizing a mean-square difference error, a de-noising effect based on noise level and motion compensation error;
      generate an optimal filtering parameter for motion-compensated temporal filtering by subsequently revising the filtering parameter based on a set of previously determined residue images via tracking a count of frames and apportioning according to a resulting square-root of each residue image of the set of previously determined residue images;
      filter the pixel intensity of the current frame based on the determined intensity weight, the pixel intensity of the previous frame, a standard deviation parameter, and the motion compensated vector of the previous frame; and
      determine a filtered pixel intensity vector based on the filtered pixel intensity of the current frame, the generated optimal filtering parameter, and a spatial weighting distribution.

14. The device of claim 13 wherein the processor is further configured to determine a set of spatial weights based on a set of neighboring pixels, and is further configured to filter the pixel intensity of the current frame based on the determined intensity weight, the set of determined spatial weights, and the motion compensated vector of the previous frame.

15. The device of claim 13 wherein the filtering parameter is a temporal filtering parameter and the processor is further configured to determine the temporal filtering parameter based on the determined set of residue images.

16. The device of claim 15 wherein the temporal filtering parameter is further based on a histogrammed set of square-rooted determined pixel-related residue images.

17. The device of claim 16 wherein the histogrammed set of square-rooted determined pixel-related residue images is based on a mode of the histogrammed set of square-rooted determined pixel-related residue images.

18. The device of claim 17 wherein the histogrammed set of square-rooted determined pixel-related residue images is further based on a portion of the histogrammed set of square-rooted determined pixel-related residue images.

19. The device of claim 13 wherein the processor is further configured to determine the filtering parameter based on a spatial statistical representation of at least one of: intensity and the motion vector.

20. The device of claim 19 wherein the filtering parameter is based on a variance of image intensity within a region associated with the current pixel.

21. The device of claim 20 wherein the filtering parameter is based on a variance of at least one directional component of a motion vector within a region associated with the current pixel.

22. The device of claim 21 wherein the filtering parameter is based on a variance of the current pixel intensity of the current frame and a variance of the motion vector within a region associated with the current pixel.

23. A computer-readable non-transitory medium having computer-executable instructions stored thereon which, when executed by a computer, configure the computer to:
   determine a pixel-related residue image based on a set of differences between a current pixel intensity of a current frame and a corresponding pixel intensity of a previous frame, the corresponding pixel intensity augmented by a motion-compensated vector of the previous frame;

determine an intensity weight based on the determined pixel-related residue image and a filtering parameter, wherein the filtering parameter provides, via minimizing a mean-square difference error, a de-noising effect based on noise level and motion compensation error;

generate an optimal filtering parameter for motion-compensated temporal filtering by subsequently revising the filtering parameter based on a set of previously determined residue images via tracking a count of frames and apportioning according to a resulting square-root of each residue image of the set of previously determined residue images;

filter the pixel intensity of the current frame based on the determined intensity weight, the pixel intensity of the previous frame, a standard deviation parameter, and the motion compensated vector of the previous frame; and determine a filtered pixel intensity vector based on the filtered pixel intensity of the current frame, the generated optimal filtering parameter, and a spatial weighting distribution.

24. The computer-readable non-transitory medium of claim 23 wherein the computer-executable instructions further configure the computer to determine the filtering parameter based on a spatial statistical representation of at least one of: intensity and the motion vector.

25. The computer-readable non-transitory medium of claim 23 wherein the computer-executable instructions further configure the computer to determine a set of spatial weights based on a set of neighboring pixels, and to further configure the computer to filter the pixel intensity of the current frame based on the determined intensity weight, the set of determined spatial weights, and the motion compensated vector of the previous frame.

26. The method of claim 10 wherein the filtering parameter is based on at least one local feature of a set of local features associated with the current frame, wherein the set of one or more local features comprises at least one of: a local variance of the current pixel intensity and a local variance of each of the motion-compensated vectors of a previous set of frames.

* * * * *